United States Patent [19]

Sagers et al.

[11] Patent Number: 5,126,733
[45] Date of Patent: Jun. 30, 1992

[54] LOCATION INFORMATION POLLING IN A COMMUNICATION SYSTEM

[75] Inventors: Richard C. Sagers, Fort Worth; Jack Boggs Butler, Bedford, both of Tex.

[73] Assignee: Motorola, Inc., Schaumburg, Ill.

[21] Appl. No.: 353,267

[22] Filed: May 17, 1989

[51] Int. Cl.$^5$ .............................................. H04B 7/00
[52] U.S. Cl. .......................... 340/825.47; 340/825.49; 340/825.08
[58] Field of Search ........... 340/825.08, 825.47, 340/825.49; 379/60, 62, 63, 59; 342/450, 457, 463, 57, 388, 389; 455/31, 32, 33, 54, 55, 56, 88, 17, 38

[56] References Cited

U.S. PATENT DOCUMENTS

| | | | |
|---|---|---|---|
| 3,644,883 | 2/1972 | Borman et al. | 342/57 |
| 3,714,650 | 1/1973 | Fuller et al. | 342/457 |
| 4,651,156 | 3/1987 | Martinez | 342/451 |
| 4,658,435 | 4/1987 | Childress et al. | 455/54 |
| 4,684,949 | 8/1987 | Kalafus | 342/57 |
| 4,742,357 | 5/1988 | Rackley | 342/450 |
| 4,797,948 | 1/1989 | Milliorn et al. | 340/825.47 |
| 4,955,050 | 9/1990 | Yamauchi | 455/33 |

FOREIGN PATENT DOCUMENTS 2191054 12/1987 United Kingdom ................. 342/57

Primary Examiner—Donald J. Yusko
Assistant Examiner—Dervis Magistre
Attorney, Agent, or Firm—Timothy Markison; Steven Parmelee; Joseph Krause

[57] ABSTRACT

A trunked communication system that supports polling requests for location information without requiring infrastructure changes. Ordinary private call talk requests are altered to include at least two inclusions of the ID code for the target communication unit. This dual representation of the ID is interpreted by the receiving unit as a poll request, to which the unit responds by providing location information on an allocated communication resource.

7 Claims, 1 Drawing Sheet

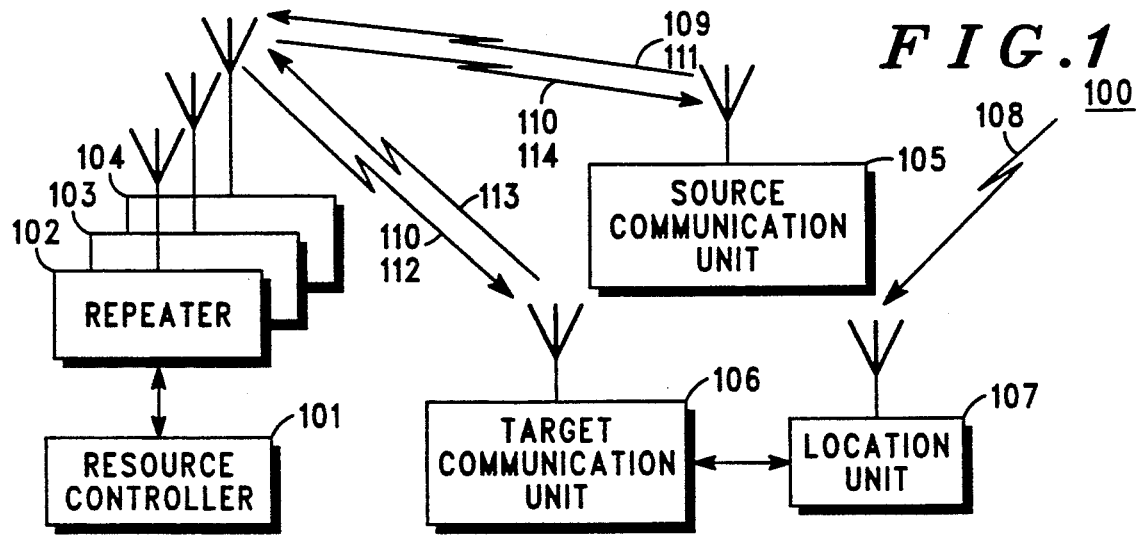
FIG.1
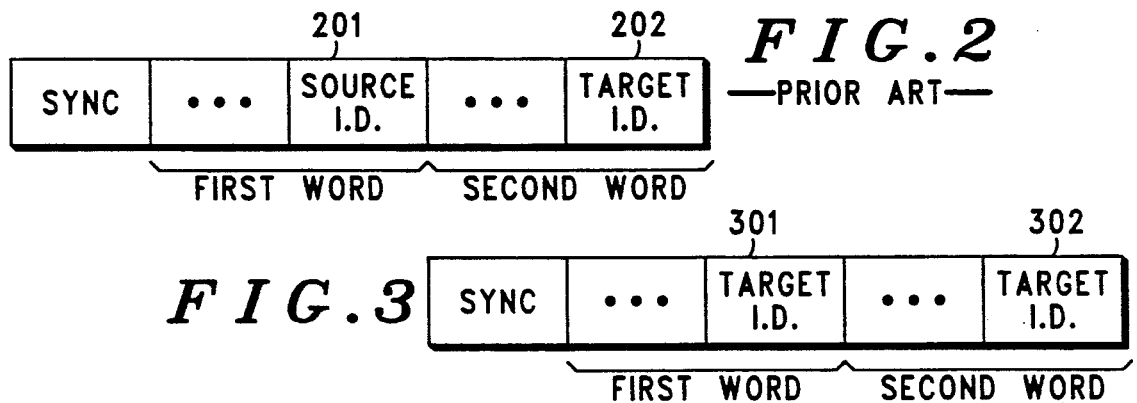
FIG.2 —PRIOR ART—

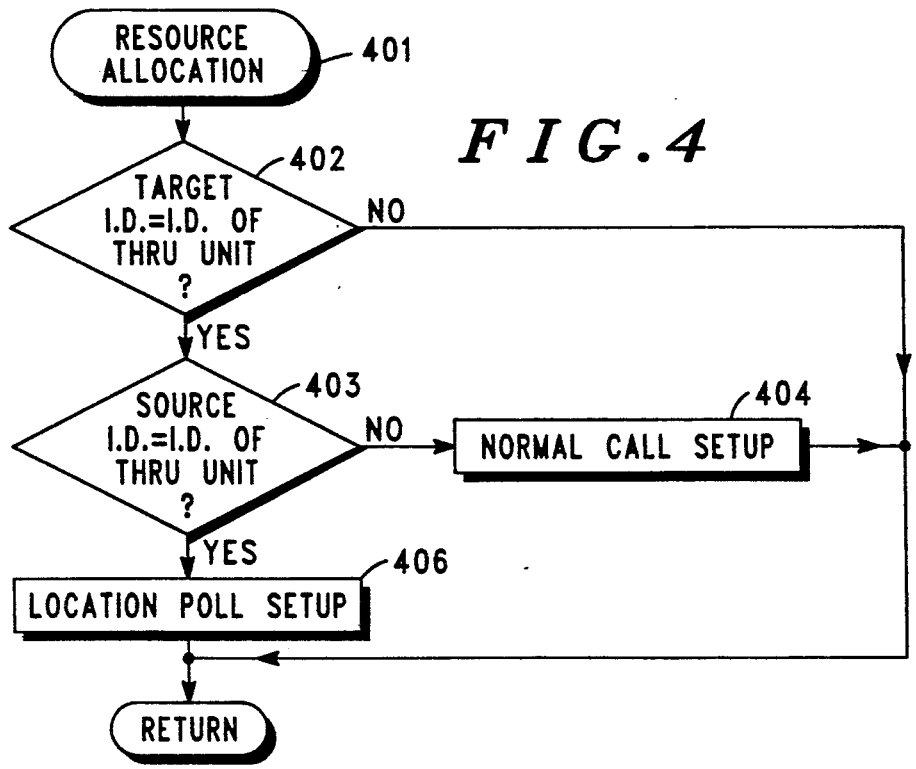
FIG.4

LOCATION INFORMATION POLLING IN A COMMUNICATION SYSTEM

TECHNICAL FIELD

This invention relates generally to RF communication systems and particularly to the conveyance of geographic location information.

BACKGROUND ART

RF communication systems, such as trunked radio communication systems, are well understood in the art. Such systems typically provide a plurality of communication resources (such as frequencies, frequency pairs, or TDM time slots) that can be allocated on an as needed basis amongst a group of member communication units by a resource controller. Generally, such as system will provide resources that support both user voice and data messages as well as control signalling to support this allocation of the resources in an orderly and efficient manner.

In such a system, a private cell between a source communication unit and a target communication unit can be established when the source communication unit initiates a talk/request message in the appropriate control signalling format. This message will typically include the ID of the source unit and the ID of the target unit. The resource controller will then cause this same information to be retransmitted along with a resource grant identification. The source and target units receive this message and begin communicating on the identified resource.

Location determining mechanisms, such as Loran C based units, are also well understood in the art. Such units function to receive Loran C signals from three separate locations, and by an appropriate calculation, determine the relative geographic location of the unit. This location information can then be transmitted through a radio communication system for use at other locations, such as a dispatcher site. Typically, such location information is either provided independently by the mobile unit itself (for instance, everytime the user sends an ordinary voice message, or at regular time intervals), or upon request by the remote site. The latter process is known as polling.

A problem exists when integrating location derivation cable communication units into existing trunked radio systems. In particular, the existing trunking system protocol does not provide for a specific polling instruction that will cause only location derivation capable communication units to respond with only the requested location information. Although such systems could be redesigned to accommodate such an instruction, in general, such infrastructure alterations are costly and occasionally trouble prone.

A need exists for a way of allowing only location information to be polled in a trunked communication system without disrupting normal voice communication protocols and without requiring modification to the infrastructure of essential protocol itself.

SUMMARY OF THE INVENTION

This need is substantially met through provision of the system disclosed herein. This system functions in accordance with communication units that have a first code and a location determining unit, such as a Loran C unit, for determining the location of the communication unit. Pursuant to this invention, when a source communication unit wishes to poll a specific target communication unit only for location information, the source communication unit transmits a first communication that includes at least two inclusions of the first code. The communication system infrastructure will process this message in an ordinary fashion, and upon allocating a communication resource, will retransmit a message that includes the dual inclusion of the first code. The target communication unit, in turn, is programmed to interpret the dual first codes as constituting a polling request for location information. The requested information can thereafter be transmitted to the source communication unit upon the allocated communication resource.

In one embodiment, the polling request and response can be made transparent to the user of the target communication unit.

In another embodiment of the invention, the first code can be the unique ID for the target communication unit.

BRIEF DESCRIPTION OF THE DRAWINGS

FIG. 1 comprises a block diagram depiction of the system;

FIG. 2 comprises a timing diagram of a prior art dual word private call talk request;

FIG. 4 comprises a flow diagram of the polling request processing.

BEST MODE FOR CARRYING OUT THE INVENTION

Figure 3:
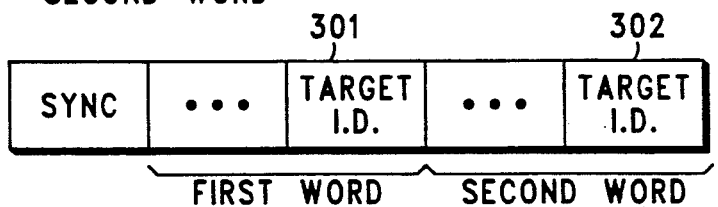
FIG. 3 comprises a timing diagram of the dual word polling request of this invention.

Referring now to the drawings, and in particular to FIG. 1, the invention can be seen as depicted generally by the numeral 100. The communication system of the invention includes a resource controller (101) that controls allocation of a plurality of communication resources, primarily through assignment of a plurality of repeaters (102), wherein each repeater supports communications on a particular identified frequency or frequency pair. In this particular embodiment, one of the repeaters (103) supports control signaling exclusively, and the remaining repeaters (104) support voice and user data messages.

In addition, the system (100) presumes a number of member communication units, including in this example a source communication unit (105), and a target communication unit (106). In this embodiment, these units may be provided through use of Syntor X 9000E land mobile radios as manufactured and sold by Motorola, Inc. Such radios including data processors that can be readily reprogrammed in accordance with this invention. The target communication unit (106) has associated therewith a location unit (107) that may be, for example, a Loran C receiver and processor that receives Loran C signals (108) and processes them in accordance with well understood prior art technique to ascertain the approximate current location of the target communication unit (106).

When the user of the source communication unit (105) wishes to establish a private call communication with the target communication unit (106), the source communication unit (105) transmits an inbound message (109) on the control signaling resource to the control signal repeater (103). The resource controller (101) processes this request and allocates an available user resource depending upon availability. When the user repeater (104) becomes available, the resource controller (101) transmits an outbound message (110) that is received by both the source communication unit (105) and the target communication unit (106).

The inbound message (109) includes, with momentary reference to FIG. 2, a first word and a second word that includes both the ID (201) for the source communication unit (105) and the ID (202) for the target communication unit (106). The outbound message (110) contains the same information as the inbound message (109) and in addition, other information may be conveyed in the outbound message, including an acknowledgment of a requested channel, or identification of a specific resource assignment. In the prior art, the reception of the outbound message (11) causes the target communication unit to alert the operator of the target communication unit that a private communication has been established. Thereafter, the source communication unit (105) can communicate privately with the target communication unit (106) by transmitting a user message (111) (either voice or data) which transmission is repeated (112) by the allocated repeater (104) to allow reception by the target communication unit (106).

Pursuant to this invention, and with reference to FIG. 3, when the source communication unit (105) needs to poll the target communication unit (106) for only location information, the source unit (105) generates a modified form of an inbound transmission on the control signalling resource wherein the ID (201) of the source unit (105) as ordinarily included in the first word of the talk request is replaced with the ID (301) of the target unit (106). The ID (302) of the target unit (106) is again repeated in the second word of the inbound message as shown in FIG. 3.

With reference to FIG. 4, target communication unit (106) receives a resource allocation message (401), the target unit (106) determines whether the target ID in the second word of the message matches its own ID (402). If not, the message can be ignored from this standpoint. Otherwise, the target unit (106) determines if the first word of the message includes a source ID different than its own ID (403). If so, a normal call setup as described above occurs (404). Otherwise, when the message includes at least two inclusions (301 and 302) of its own ID, the target unit (106) interprets this message as a location poll, and responds by transmitting (113) its current location information as ascertained by its associated location unit (107) on the allocated resource (406).

The source communication unit (105) will receive this transmission (114) as repeated by the allocated repeater (104) such that the requested location information can be processed as desired.

If desired, the receipt of, processing, and response to the poling request can be made transparent to the user; that is, no visual or audible indication need be provided to the user that a poling request regarding location has been received or responded to.

What is claimed is:

1. In a communication system that includes a resource allocator that controls allocation of a plurality of communication resources through assignment of a plurality of repeaters, and at least a source communication unit and a communication unit, wherein the communication unit includes:
   location determining means for determining the approximate location of the communication unit;
   a method of polling, by the source communication unit, the communication unit to obtain location information, comprising the steps of:
   A) from the source communication unit seeking to poll the communication unit for location information, transmitting to the communication unit a modified inbound transmission that includes at least two inclusions of the first code via a communication resource allocated to the source communication unit by the resource allocator;
   B) receiving, in the communication unit, the modified inbound transmission and determining that the modified inbound transmission includes the at least two inclusions of the first code; and
   C) transmitting to the source communication unit via the allocated communication resource of a communication that includes the location information in response to receiving the modified inbound transmission.

2. The method of claim 1 wherein the first code comprises an ID for the communication unit.

3. The method of claim 1 wherein the first communication includes at least two data words.

4. The method of claim 3 wherein the first code comprises an ID for the communication unit, and wherein each of the two data words includes at least one inclusion of the ID.

5. In a communication system having a resources controller for controlling allocation of a plurality of communication resources, wherein one of the communication resources comprises a dedicated control signalling resource, and wherein the communication system further includes:
   at least one communication unit having a first ID: and
   a second communication unit having:
      a second ID; and
      location determining means for determining the location of the second communication unit; a method of polling the second communication unit to obtain location information, comprising the steps of:
      A) transmitting, from the first communication unit, on the control signalling resource, a first communication that includes at least two inclusion of the second ID;
      B) allocating, at the resource controller, a particular one of the communication resources to support communications between the first and second communication units;
      C) sourcing, from the resource controller, a second communication indicating allocation of the particular communication resource and including at least two inclusions of the second ID;
      D) receiving, in the second communication unit, the second communication, and determining that the second communication includes the at least two inclusions of the second ID;
      E) transmitting, in response to receiving the second communication, on the particular communication resource, a third communication that includes the location information.

6. In a communication system that includes a resource allocator that controls allocation of a plurality of communication resources through assignment of a plurality of repeaters, and at least a source communication unit and a communication unit, wherein the communication unit includes;

a first code; and location determining means for determining the approximate location of the communication unit;

a method for the communication unit to provide location information to the source communication unit comprising the steps of:

A) receiving, via a communication resource allocated to the source communication unit by the resource allocator, a communication from the source communication unit seeking to poll the communication unit for location information, the communication including at least two inclusions of the first code;

B) determining that the communication includes the at least two inclusions of the first code;

C) transmitting, via the allocated communication resource, the location information when the communication unit determines that the communication included the at least two inclusions of the first code.

7. The method of claim 6, wherein the first code comprises an ID for the communication unit.

* * * * *

UNITED STATES PATENT AND TRADEMARK OFFICE
CERTIFICATE OF CORRECTION

PATENT NO. : 5,126,733

DATED : June 30, 1992

INVENTOR(S) : Sagers et al

It is certified that error appears in the above-identified patent and that said Letters Patent is hereby corrected as shown below:

Column 3, after line 66, please insert the paragraph --a first code; and--

Signed and Sealed this

Fourteenth Day of September, 1993

Attest:

BRUCE LEHMAN

*Attesting Officer*    *Commissioner of Patents and Trademarks*